(12) United States Patent
Deng et al.

(10) Patent No.: US 6,798,610 B1
(45) Date of Patent: Sep. 28, 2004

(54) DISK DRIVE WITH SELF SERVO WRITING CAPABILITY

(75) Inventors: Youping Deng, Sunnyvale, CA (US); Lin Guo, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/556,233

(22) Filed: Apr. 24, 2000

(51) Int. Cl.[7] ............................................. G11B 5/596
(52) U.S. Cl. .................................. 360/78.05; 360/78.12
(58) Field of Search ............................... 360/75, 51, 46, 360/63, 77.02, 78.05, 78.12, 266.2

(56) References Cited

U.S. PATENT DOCUMENTS

| | | | | |
|---|---|---|---|---|
| 4,980,783 A | * | 12/1990 | Moir et al. ............... 360/77.02 |
| 5,189,578 A | | 2/1993 | Mori et al. ................. 360/106 |
| 5,303,105 A | | 4/1994 | Jorgenson .................. 360/106 |
| 5,339,204 A | * | 8/1994 | James et al. ................. 360/51 |
| 5,448,429 A | * | 9/1995 | Cribbs et al. ................ 360/75 |
| 5,521,778 A | | 5/1996 | Boutaghou et al. ......... 360/106 |
| 5,541,784 A | * | 7/1996 | Cribbs et al. ................ 360/75 |
| 5,570,241 A | * | 10/1996 | Nielsen et al. ............... 360/46 |
| 5,668,679 A | | 9/1997 | Swearingen et al. .......... 360/75 |
| 5,856,896 A | | 1/1999 | Berg et al. .................. 360/104 |
| 5,875,064 A | * | 2/1999 | Chainer et al. .............. 360/75 |
| 5,875,077 A | * | 2/1999 | Uwabo et al. ............ 360/266.2 |
| 5,901,010 A | * | 5/1999 | Glover et al. ............ 360/78.12 |
| 5,907,447 A | * | 5/1999 | Yarmchuk et al. ............ 360/75 |
| 5,909,333 A | * | 6/1999 | Best et al. .................... 360/51 |
| 5,920,441 A | * | 7/1999 | Cunningham et al. ... 360/78.05 |
| 6,005,742 A | * | 12/1999 | Cunningham et al. ... 360/78.05 |
| 6,040,955 A | | 3/2000 | Brown et al. ................ 360/75 |
| 6,259,574 B1 | * | 7/2001 | Chainer et al. ............... 360/51 |
| 6,292,320 B1 | * | 9/2001 | Mason et al. ................. 360/63 |
| 6,301,071 B2 | * | 10/2001 | Chainer et al. ............... 360/75 |
| 6,304,407 B1 | * | 10/2001 | Baker et al. .................. 360/75 |
| 6,310,740 B1 | * | 10/2001 | Dunbar et al. ................ 360/46 |

OTHER PUBLICATIONS

U.S. application Ser. No. 09/073,600, filed May 6, 1998, entitled "Parallel Servo with Ultra High Bandwidth Off–Track Detection," and assigned to the assignee of the present invention.
U.S. application Ser. No. 09/388,512, filed Sep. 2, 1999, entitled "Method and Apparatus for Performing a Flaw Scan of a Disk Drive," and assigned to the assignee of the present invention.

* cited by examiner

*Primary Examiner*—David Hudspeth
*Assistant Examiner*—Fred F. Tzeng
(74) *Attorney, Agent, or Firm*—David M. Sigmond (57) ABSTRACT

The present invention is directed to utilizing the capabilities of multi-stage actuators in disk drives to do self servo writing on the disk surfaces, thereby avoiding the use of a servo track writer. In one embodiment, a crash stop that limits the range of motion of a primary actuator is used as an initial reference point for a secondary actuator associated with a first head to position the first head to write a first servo track on a first disk surface. The first servo track is subsequently used as a reference point for a secondary actuator associated with a second head to position the second head for writing one or more servo tracks on a second disk surface. One of these servo tracks on the second disk surface is then used as the reference point relative to which the primary and/or secondary actuator associated with the first head moves the first head to write one or more servo tracks on the first disk surface. This process of alternatingly using the servo tracks written by one head as the reference point relative to which the primary and/or secondary actuators move the other head to write further servo tracks is repeated until all of the desired servo tracks are written.

60 Claims, 4 Drawing Sheets

DISK DRIVE WITH SELF SERVO WRITING CAPABILITY

FIELD OF THE INVENTION

The present invention relates to disk drives and, in particular, to the writing of servo tracks on a disk within the disk drive.

BACKGROUND OF THE INVENTION

A disk drive is a device that is commonly employed in computer systems to store data. Typically, a disk drive includes: (1) one or more disks that each have a plurality of concentric tracks on which data is stored; (2) a spin motor for rotating the disk or disks; (3) one or more heads that are each capable of writing and/or reading data to/from a track on a disk; (4) an actuator for moving the head or heads to a desired location adjacent to a disk so that data can be written to the disk or read from the disk; and (5) circuitry for transferring data between a disk and a portion of a host computer system that is exterior to the disk drive, such as a random access memory (RAM).

A disk drive also typically includes a servo system that operates to move a head over a defined track on a disk surface and maintain the head over the defined track until directed to move the head over a different track. The servo system maintains the position of the head over a defined track based upon information that is read from a servo track. In one type of drive, the servo tracks are embedded in or coincident with the user data tracks, i.e., the servo track and the user data track form a single physical track with the servo data interspersed among the user data. Typically, the servo track: (1) identifies the particular track over which a head is positioned; and (2) provides data from which the position of the head relative to the center line of the track can be determined. The identification of the particular track is primarily used when the head is being moved from one track to another track (which is commonly known as a seek operation) to determine when the head is positioned over the desired track. Once the head is over the desired track, data indicating the position of the head relative to the center line of the track is determined and used to maintain the head over the desired track (which is commonly known as a tracking operation). For example, if the data indicates that the head is positioned to one side of the center line, the servo system causes the actuator to move the head towards the center line.

Presently, the servo tracks are usually written on the disk surfaces of a disk drive during the manufacturing process by a servo track writer. Further, the operation is usually done in a clean room environment to prevent contamination of the disk drive. As a consequence, the throughput of a manufacturing facility is limited by the number of servo track writers that are available and the availability of clean room space to house the servo track writers.

As an alternative to using a servo track writer, the drive itself can be used to write the servo tracks in what is known as self servo writing operation. In this case, a motor associated with the actuator is used to move the actuator arm in discrete steps to write each servo track.

SUMMARY OF THE INVENTION

The present invention is directed to a disk drive that uses a multi-stage actuator to write servo tracks on the disks. The multi-stage actuator includes a primary actuator for coarsely positioning a head and a secondary actuator for finely positioning the head.

In one embodiment, a disk drive includes at least two separate and substantially parallel disk surfaces that are capable of storing data. Associated with each disk surface is a head for transferring data between the disk surface and the exterior environment. A multi-stage actuator is used to move the heads to desired positions over the disk surfaces for the transfer of data. The multi-stage actuator includes a primary actuator for coarsely positioning the heads relative to the disk surfaces. Associated with each head is a secondary actuator that permits the position of the head to be more finely controlled. The data transfer circuitry of the disk drive, which is normally used to write/read user data to/from the disk, is also adapted to write the servo tracks on the disk surfaces. To elaborate, a servo system associated with the data transfer causes the primary and secondary actuators associated with the first head to position the first head for writing the initial servo track on the first disk surface. After the initial servo track has been written on the first surface, the initial servo track is used as a reference relative to which the secondary actuator associated with the second head positions the second head to write the initial servo track and possibly several servo tracks on the second disk surface. A servo track on the second disk surface is subsequently used as a reference relative to which the secondary actuator associated with the first head positions the head to write one or more servo tracks on the first disk surface. This process of alternatingly using a servo track on one disk surface as a reference relative to which the secondary actuator associated with the head over another disk surface positions the head to write servo tracks is repeated until, for a given position of the primary actuator, substantially all of the servo tracks have been written. The primary actuator is then repositioned and the process is repeated until all of the servo tracks have been written on the disk.

In another embodiment, the primary actuator is positioned with respect to a known physical reference point before the initial servo track is written on the first disk surface. One such physical reference point is a crash stop that is used to prevent the primary actuator from moving the heads beyond a predetermined range. By using such a physical reference point, any positional error in the initial servo track is substantially reduced. As a consequence, a potential source of positional error in the subsequently written servo tracks is substantially eliminated.

In yet a further embodiment, the primary actuator is positioned to substantially reduce the number of times that the primary actuator must be repositioned in order to write all of the servo tracks on the first and second disk surfaces. To elaborate, at least with respect to certain bands of servo tracks, the primary actuator is positioned so that the secondary actuators are able to traverse substantially their entire range of motion during the writing of the servo tracks. As a consequence, as many servo tracks as possible are written before the primary actuator is repositioned.

DETAILED DESCRIPTION

Figure 1A:
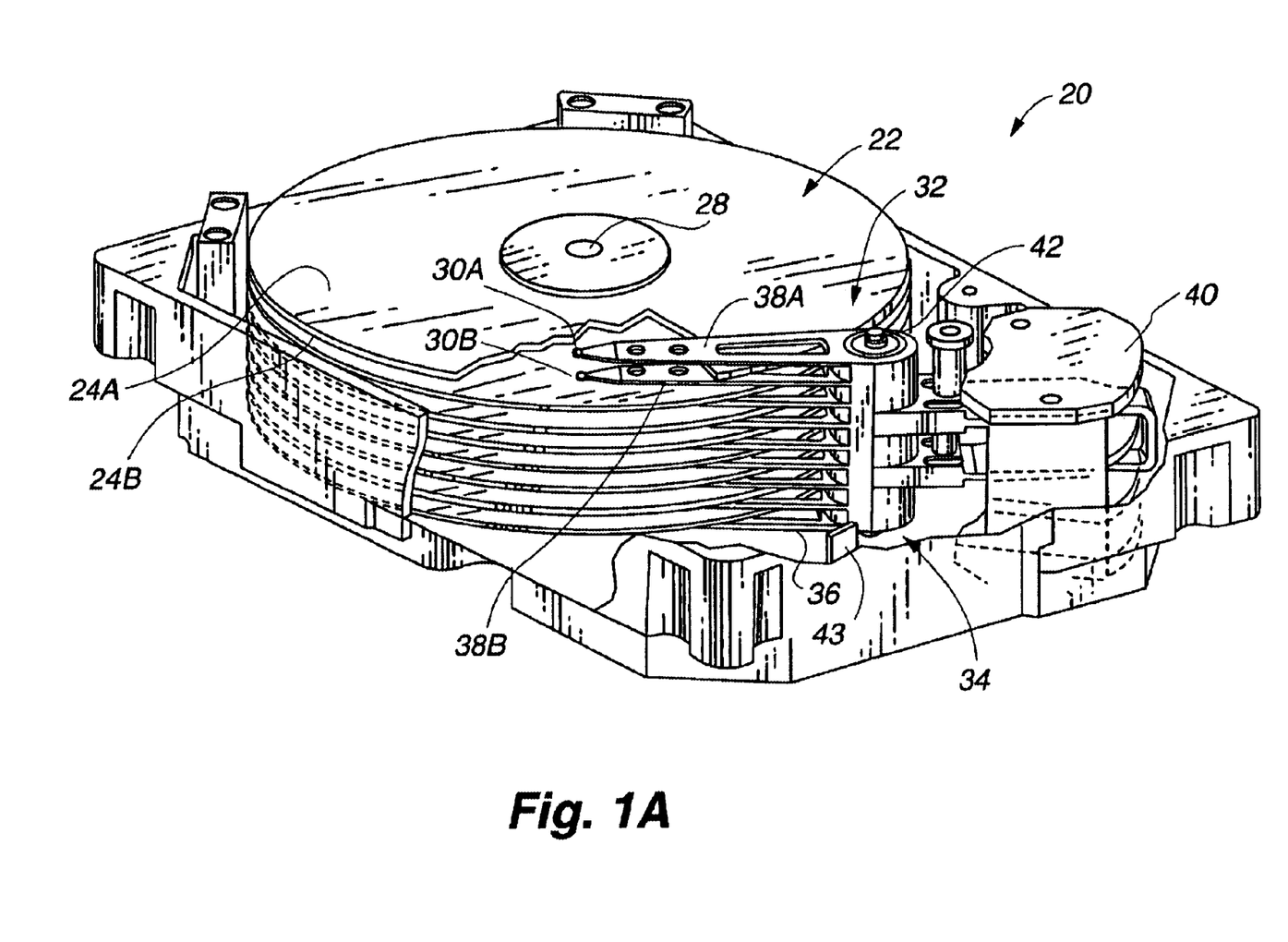
FIG. 1A illustrates a typical disk drive with a multi-stage actuator.
Figure 1B:
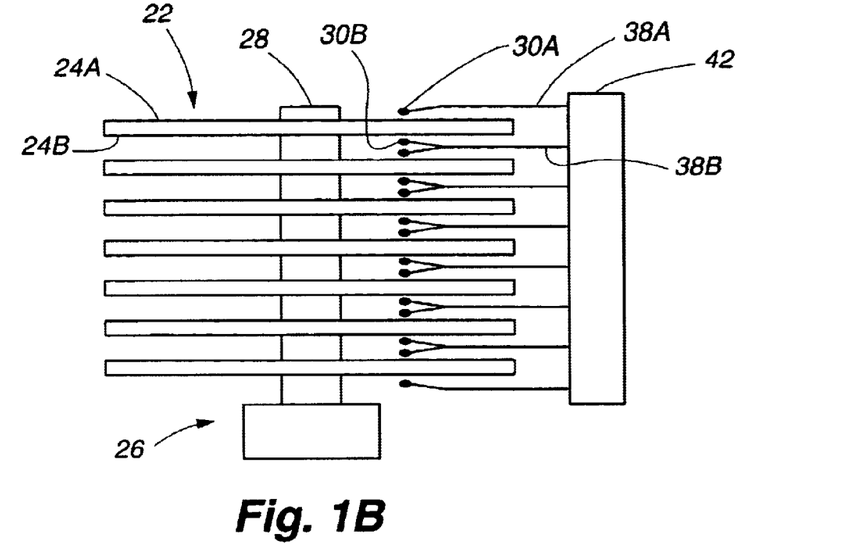
FIG. 1B is a functional side view of certain components in the drive illustrated in FIG. 1A.

FIGS. 1A and 1B illustrate a typical disk drive 20 that includes a plurality of disks. To simplify the description of the invention, it is only necessary to consider a single magnetic disk 22. It should, however, be appreciated that the invention is adaptable to disk drives that include multiple disks. The disk 22 is capable of storing data in concentric tracks located on a first surface 24A and a second surface 24B of the disk 22. A spin motor 26 is used to rotate the disk 22 about a central axis 28 at a substantially constant rotational velocity.

A first head 30A is provided for transferring data between the first surface 24A of the disk 22 and the exterior environment. Similarly, a second head 30B is provided for transferring data between the second surface 24B of the disk 22 and the exterior environment. The first and second heads 30A, 30B each include a write element for writing data to the disk 22 and a read element for reading data from the disk 22.

To position the first and second heads 30A, 30B over the tracks on the first and second surfaces 24A, 24B of the disk 22 so that data can be transferred, a multi-stage actuator 32 is provided. Included in the multi-stage actuator 32 is a primary actuator 34 for coarsely positioning the first and second heads 30A, 30B over desired locations on the first and second surfaces 24A, 24B of the disk 22. The primary actuator 34 is comprised of a carriage 36 that includes first and second arms 38A, 38B for holding, respectively, the first and second heads 30A, 30B. Typically, the first and second arms 38A, 38B each include a rigid portion and a flexible, suspension portion. The suspension portion is located between the head and the rigid portion. A voice coil motor 40 is provided for rotating the first and second arms 38A, 38B about an axis 42. To prevent the primary actuator 34 from moving the heads beyond the outer edge of the disks and contacting the interior of the disk housing (not shown), a crash stop 43 is provided.

Figure 2:
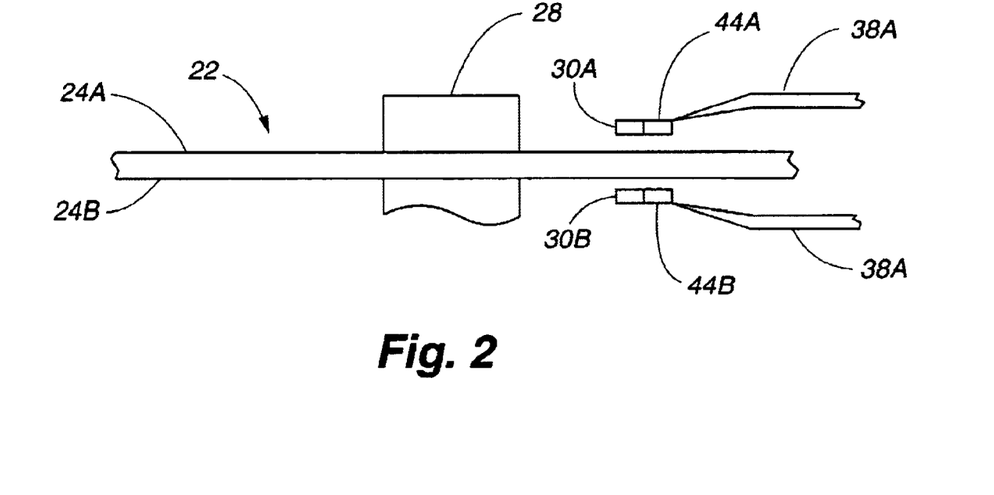
FIG. 2 is a functional diagram that shows the secondary actuators that are used to finely position heads relative to the disk surfaces.

With reference to FIG. 2, the multi-stage actuator 32 includes secondary actuators 44A, 44B for fine positioning of, respectively, the first and second heads 30A, 30B. The two secondary actuators are independently controllable. Independent control allows one of the secondary actuators to be implementing a seek operation with one of the heads (i.e., moving a head from one track to another track) while the other secondary actuator is implementing a tracking operation with the other head (i.e., maintaining the position of the other head over a desired track). Further, independent control permits each of the secondary actuators 44A, 44B to be simultaneously implementing either a tracking function or a seeking function. For purposes of the description, the secondary actuators 44A, 44B are both rotary types of actuators. An example of such a secondary actuator can be found in U.S. Pat. No. 5,521,778. It should, however, be appreciated that the invention is equally applicable to a disk drive that uses a secondary actuator that moves a head in a linear manner.

Figure 3:
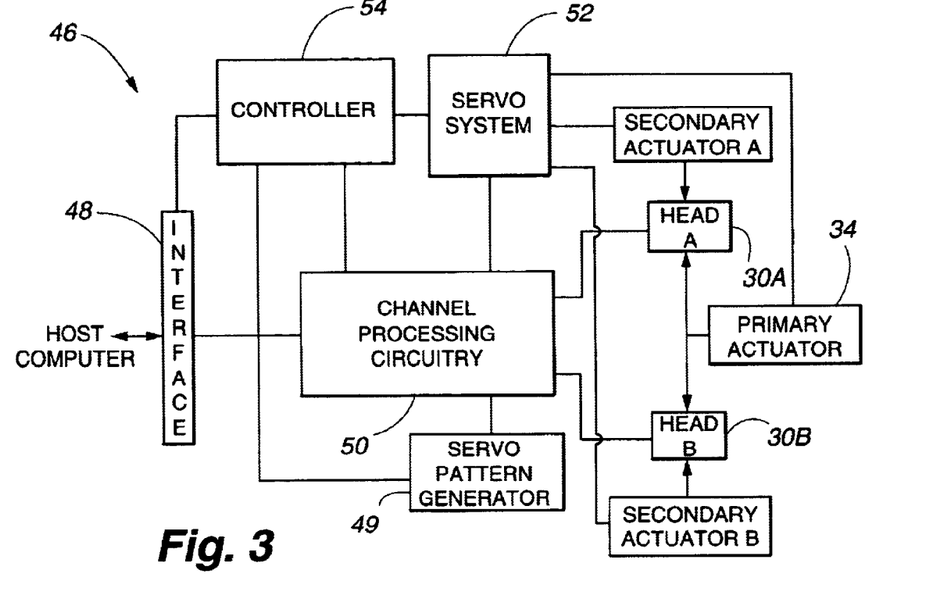
FIG. 3 is a function block diagram of certain elements of the disk drive that are used in self servo writing.

The disk drive 20 further includes a data transfer device that operates in conjunction with the multi-stage actuator 32 to write servo tracks on the disk 22. With reference to FIG. 3, an embodiment of the data transfer device 46 is illustrated that operates to: (1) use the primary actuator 34 and secondary actuators 44A, 44B to position the first and second heads 30A, 30B for the writing of servo tracks on the disk 22; (2) write the initial servo track on the first surface 24A of the disk 22; (3) use the initial servo track as a reference for writing one or more servo tracks on the second surface 24B of the disk 22; (4) use a servo track written on the second surface 24B of the disk 22 as a reference for writing further servo tracks on the first surface 24A of the disk adjacent to the initial servo track; (5) use a servo track, other than the initial servo track, written on the first surface 24A of the disk 22 as a reference for writing further servo tracks on the second surface 24B of the disk 22; and (6) repeat steps (4) and (5) until all of the servo tracks have been written on the first and second surfaces 24A, 24B of the disk 22.

The data transfer device 46 includes some, if not all of the circuitry normally used to read and write user data to and from the disk 22. Specifically, the device 46 includes an interface 48 that is capable of transferring data between the disk drive 20 and the exterior environment (typically, a host computer). The device 46 also includes a servo pattern generator 49 for providing the servo data that is written to the disk 22.

The data transfer device 46 also includes channel processing circuitry 50 that is normally used to process and/or manage user data that is to be written to the disk 22 by one of the heads 30A, 30B and that has been read from the disk by one of the heads 30A, 30B. For writing servo tracks on the disk 22, the channel processing circuitry 50 is capable of: (1) processing and/or managing servo data that is read from a servo track on the disk 22 by one of the heads 30A, 30B and providing the servo data to a servo system; and (2) while the servo data is being read and provided to a servo system, write a servo track to the disk 22 using one of the heads 30A, 30B and servo data provided by the servo pattern generator 49.

The data transfer device 46 further includes a servo system 52 that is normally used in the writing of user data to: (1) to control the primary actuator 34 to coarsely position the first and second heads 30A, 30B at a desired location over, respectively, the first and second surfaces 24A, 24B of the disk 22; and (2) to control the secondary actuators 44A, 44B to finely position the first and second heads 30A, 30B, respectively. For the purpose of writing servo tracks, the servo system 52 serves the same functions with the only difference being that servo data and timing data rather than user data is written to the disk 22. The servo system 52 is susceptible to a number of different approaches, including the parallel loop, master-slave loop, dual feedback loop, and master-slave with decoupling approaches.

The data transfer device 46 further includes a controller 54 for coordinating the operation of the interface 48, servo pattern generator 49, channel processing circuitry 50, and servo system 52. With respect to the servo system 52, the controller 54 operates to identify the tracks that the primary actuator 34 and each of the secondary actuators 44A, 44B should either be moving the heads 30A, 30B towards (i.e., seeking) or following (i.e., tracking). As is seen, controller 54 is connected to interface 48, servo pattern generator 49, channel processing circuitry 50 and servo system 52.

Figure 4:
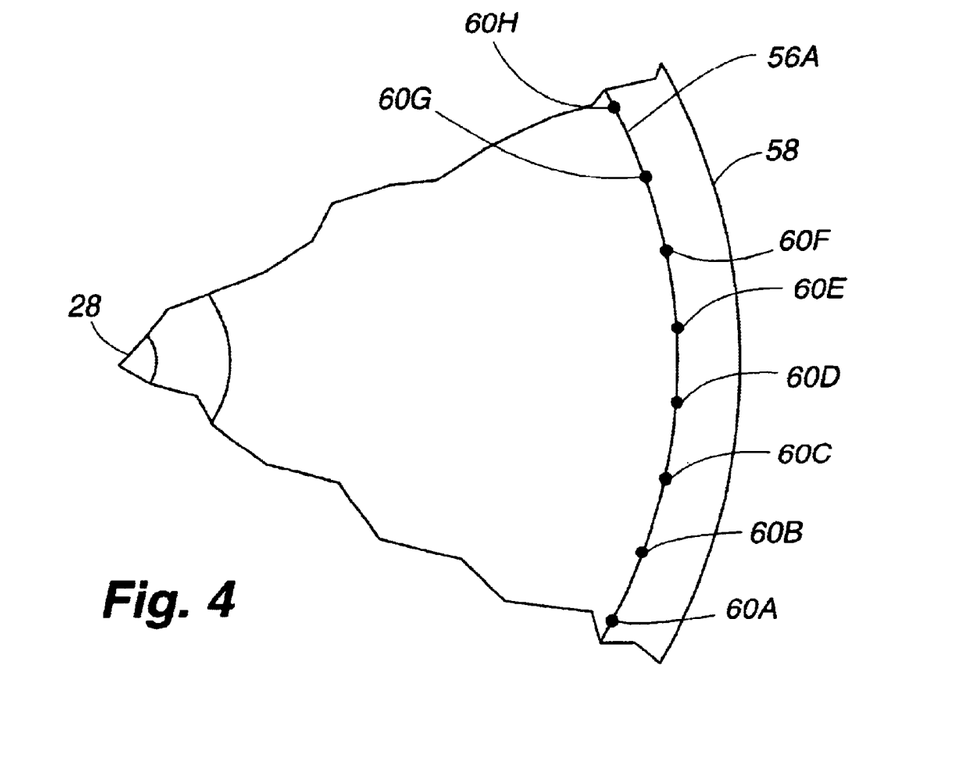
FIG. 4 illustrates the initial servo track written on a disk.
Figure 5:
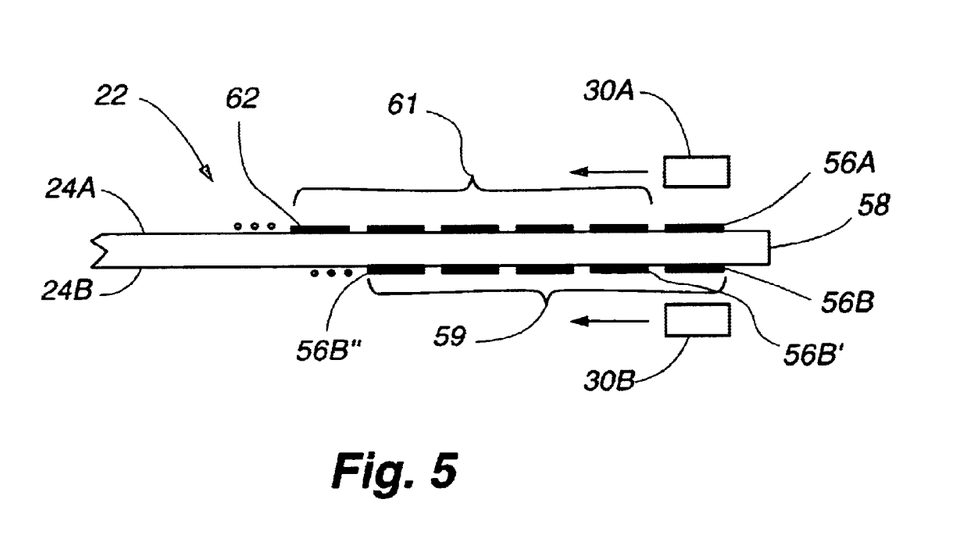
FIG. 5 illustrates the self writing of servo tracks on the first and second surfaces of a disk.

The self servo track writing operation commences with the receipt of a command from an exterior device, such as a microprocessor, at the interface 48 directing the disk drive 20 to perform the self servo writing operation. In response to the command, the controller 54 directs the servo system 52 to position the primary actuator 34 against the crash stop 43 for writing the initial servo track 56A (FIG. 4) on the first surface 24A of the disk 22 and adjacent to the edge 58 of the disk 22. By positioning the primary actuator 34 against the crash stop 43, any positional error in the initial servo track 56A is substantially reduced, i.e., the end of the track should meet the start of the track with little, if any, radial offset. This, in turn, reduces any positional error in the servo tracks that are subsequently written on the disk 22, the quality of which is dependent upon the initial servo track 56A. The controller 54 also directs the servo system 52 to cause the secondary actuator 44A to position the head 30A for writing the initial servo track 56A on the first surface 24A of the disk 22. Likewise, the controller 54 causes the head 30B to be positioned with the secondary actuator 44B for writing the initial servo track 56B on the second surface 24B of the disk 22 (FIG. 5).

Once the first head 30A has been positioned, the controller 54 causes the servo data for the initial servo track 56A to be transferred from the servo pattern generator 49 to the first head 30A for writing on the disk. The content and the location of the servo data in the initial servo track 56A is dependent upon the particular servo mechanisms being implemented in the drive. In one embodiment, the servo data is in the form of servo sectors that are typically located at positions 60A–60H that are regularly spaced from one another. In one embodiment, the servo sectors for a servo track include an index that defines the beginning of the track, a track address, a segment addresses (i.e., a portion of the track), and data (i.e., servo bursts) that can be used to facilitate the following of the track. Included in the servo data of the initial servo track is a clock or timing signal. The clock signal is used by the servo system 52 to locate each servo sector along the track. In particular, the clock signal provides pulses or cycles that can be counted and the count used to establish predetermined spacing between the servo sectors in a servo track.

Once the initial servo track 56A has been written and the second head 30B positioned for writing the initial servo track 56B on the second surface 24B of the disk 22, the controller 54 causes the servo data from the initial servo track 56A to be read and used by the servo system 52 so that the first head 30B tracks or follows the initial servo track 56A. By having the first head 30A follow the initial servo track 56A and by maintaining the position of the second head 30B relative to the first head 30A, the second head 30B follows a path over the second surface 24B that substantially mirrors the initial servo track 56A. In addition, the controller 54 causes the clock or timing signal from the initial servo track 56A to be used to establish the desired spacing between the servo sectors of the initial servo track 56B. The controller 54 also causes the servo data for the initial servo track 56B to be transferred from the servo pattern generator 49 to the second head 30B for writing on the disk and thereby establishing the servo track 56B on the second surface 24B of the disk 22.

In one embodiment, the servo data in servo track 56A is used as a reference to write not only the initial servo track 56B but also several other servo tracks on the second surface 24B of the disk 22. In this case, once the initial servo track 56B has been written, the controller 54 causes the servo system 52 to use the secondary actuator 44B to adjust the position of the second head 30B for writing the next servo track 56B' on the second surface of the disk. This process is typically repeated to establish a group of servo tracks 59 on the second surface 24B of the disk. For a given position of the primary actuator 34, the number of servo tracks that can be established on the second surface 24B is limited to the point or close to the point at which the multi-stage actuator 32 is incapable of adequately tracking the initial servo track 56A and using the information from the initial servo track 56A as a reference for writing servo tracks on the second surface 24B of the disk 22. Generally, this occurs, for a given position of the primary actuator 34, when the secondary actuator 44A is at or near the limit of its motion in one radial direction and the secondary actuator 44B is at or near the limit of its motion in the opposite radial direction.

At this point, one of the servo tracks established on the second surface 24B of the disk 22 is used as a reference to write further servo tracks on the first surface 24A of the disk 22. Typically, the last servo track 56B" written on the second surface 24B is the furthest from the edge 58 and is used as the reference for writing further servo tracks on the first surface 24A of the disk 22. Since the servo track 56B" is going to be used as a reference, the track includes the clock signal that is used to position the servo sectors during the writing of the additional servo tracks on the first surface 24A of the disk 22. It should, however, be appreciated that any of the servo tracks established on the second surface 24B can be used as the reference provided the servo track includes the clock signal. In any event, the controller 54 causes the process to be repeated to write a group of servo tracks 61 on the first surface 24A of the disk 22. Specifically, the servo data from the servo track 56B" on the second surface 24B of the disk 22 is used by the servo system 52 to maintain the position of the second head 30B over the servo track 56B", the secondary actuator 44A positions the first head 30A over the first surface 24A to establish the group of servo tracks 61 on the first surface 24A of the disk 22. The group of servo tracks 61 contains the same number of servo tracks as the group of servo tracks 59. In addition, the group of servo tracks 61 includes servo track 62. After the primary actuator 34 has been repositioned to write a new band of servo tracks, the servo track 62 is used to write a second band of servo tracks on the second surface 24B in the same manner that the initial track 56A was used in writing the first band of servo tracks on the second surface 24B. Consequently, servo track 62 includes the clock signal. Likewise, while primary actuator 34 remains in a fixed position (except for track following adjustments), one of the servo tracks in the second band of servo tracks on the second surface 24B that includes the clock signal is then used to write another band of servo tracks on the first surface 24A in the same manner that servo track 56B" was used to write servo tracks on the first surface 24A.

Once all of the servo tracks have been written on the first and second surfaces 24A, 24B of the disk 22 for a given position of the primary actuator 34, the controller 54 causes the primary actuator 34 to be repositioned and the process is repeated. By using the last servo track written on the first surface 24A of the disk 22 (i.e., the servo track 62) repositioning of the primary actuator 34 is substantially reduced, thereby reducing a potential source of error. The controller 54 causes the servo track writing process of using a reference on one surface of the disk 22 to facilitate the writing of servo tracks on the other surface of the disk 22 in an alternating manner to continue until all of the servo tracks have been established on both surfaces 24A, 24B of the disk 22.

After all of the servo sectors have been established on the first and second surfaces 24A, 24B of the disk 22, the clock or timing signal is no longer needed to establish desired spacing between the servo sectors. Consequently, the clock or timing signal present between the servo sectors can be overwritten with user data.

All of the servo tracks on first and second surfaces 24A and 24B of the disk 22 can be coincident with user data tracks. Alternatively, some of the servo tracks (e.g., tracks 56A and 56B) closest to edge 58 of disk 22 can be outside the data regions of first and second surfaces 24A and 24B that contain the user data tracks, in which case these servo tracks will contain exclusively servo information.

The invention is applicable or adaptable to disk drives in which: (1) there are two or more heads associated with a single surface of a disk and secondary actuators are associated with two or more of the heads; (2) there are two or more heads associated with disk surfaces that are, in turn, associated with different disks within the drive; (3) there are two or more primary actuators, rather than the single primary actuator described above; (4) a primary actuator is utilized that moves a head in a linear manner; (5) a secondary actuator is employed that moves a head in a linear manner; (6) primary and secondary actuators are utilized that involve combinations of rotary and linear actuators; (7) the servo track data is received from the exterior environment; (8) the servo tracks are written away from the center of the disk(s) rather than towards the center of the disk(s); (9) the servo tracks are written out of sequence; (10) only one servo track is written on a surface of a disk at a time; (11) the device 46 that cooperates with the multi-stage actuator to write the servo tracks is a separate device from the device used to write and/or read user data on the disk(s); and (12) the multi-stage actuator has more than two stages.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described above is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A disk drive, comprising:
   first and second disk surfaces that are substantially parallel with and spaced from one another;
   first and second heads for transferring data to and from the first and second disk surfaces, respectively;
   a multi-stage actuator that includes a primary actuator for positioning the first and second heads, a first secondary actuator for positioning the first head, and a second secondary actuator for positioning the second head; and
   a data transfer device that includes a servo system and a servo pattern generator, wherein the data transfer device causes the first head to write a first servo track to the first disk surface while the primary actuator positions the first and second heads without using the second head, and the data transfer device causes the second head to write a second servo track to the second disk surface while the primary actuator positions the first and second heads in response to servo information that the first head reads from the first servo track.

2. The disk drive of claim 1, wherein the data transfer device causes the second head to write a third servo track, spaced from the second servo track, to the second disk surface while the primary actuator positions the first and second heads in response to the servo information that the first head reads from the first servo track.

3. The disk drive of claim 1, wherein the data transfer devices causes the first head to write a third servo track, spaced from the first servo track, to the first disk surface while the primary actuator positions the first and second heads in response to servo information that the second head reads from the second servo track.

4. The disk drive of claim 1, wherein the data transfer device causes the first head to write all servo tracks written to the first disk surface, except for the first servo track, while the primary actuator positions the first and second heads in response to servo information that the second head reads from the second disk surface.

5. The disk drive of claim 1, wherein the data transfer device causes the second head to write all servo tracks written to the second disk surface while the primary actuator positions the first and second heads in response to servo information that the first head reads from the first disk surface.

6. The disk drive of claim 1, wherein the data transfer device causes the first head to write the first servo track to the first disk surface while the primary actuator positions the first and second heads in response to a physical reference in the disk drive.

7. The disk drive of claim 6, wherein the physical reference is a crash stop.

8. The disk drive of claim 6, wherein the first servo track is the only servo track written in the disk drive in which the primary actuator uses the physical reference for servo track positioning.

9. The disk drive of claim 1, wherein the first head reads and writes all servo information and user data that is written to and read from the first disk surface, and the second head reads and writes all servo information and user data that is written to and read from the second disk surface.

10. The disk drive of claim 1, wherein the first and second disk surfaces are opposing surfaces of a single magnetic disk.

11. A method of servo track writing in a disk drive, comprising:
    providing first and second disk surfaces;
    providing first and second heads for transferring data to and from the first and second disk surfaces, respectively;
    providing a multi-stage actuator that includes a primary actuator for coarsely positioning the first and second heads, a first secondary actuator for finely positioning the first head, and a second secondary actuator for finely positioning the second head;
    writing a first servo track from the first head to the first disk surface while the multi-stage actuator positions the first head without using the second head; and
    writing a second servo track from the second head to the second disk surface while the multi-stage actuator positions the second head in response to servo information that the first head reads from the first servo track.

12. The method of claim 11, including writing a third servo track, spaced from the second servo track, from the second head to the second disk surface while the multi-stage actuator positions the second head in response to the servo information that the first head reads from the first servo track.

13. The method of claim 11, including writing a third servo track, spaced from the first servo track, from the first head to the first disk surface while the multi-stage actuator positions the first head in response to servo information that the second head reads from the second servo track.

14. The method of claim 11, including writing all servo tracks written to the first disk surface, except for the first servo track, while the multi-stage actuator positions the first head in response to servo information that the second head reads from the second disk surface.

15. The method of claim 11, including writing all servo tracks written to the second disk surface while the multi-stage actuator positions the second head in response to servo information that the first head reads from the first disk surface.

16. The method of claim 11, including writing the first servo track while the multi-stage actuator uses a physical reference in the disk drive to position the first head.

17. The method of claim 16, wherein the physical reference is a crash stop.

18. The method of claim 16, wherein the first servo track is the only servo track written in the disk drive in which the multi-stage actuator uses the physical reference for servo track positioning.

19. The method of claim 11, wherein the first head writes all servo information written to the first disk surface, writes all user data written to the first disk surface and reads all user data read from the first disk surface, and the second head writes all servo information written to the second disk surface, writes all user data written to the second disk surface and reads all user data read from the second disk surface.

20. The method of claim 11, wherein the first and second disk surfaces are opposing surfaces of a single magnetic disk.

21. A method of servo track writing in a disk drive, comprising:
    providing a disk with first and second disk surfaces;
    providing first and second heads for transferring data to and from the first and second disk surfaces, respectively;
    providing a multi-stage actuator that includes a primary actuator for positioning the first and second heads, a first secondary actuator for positioning the first head without positioning the second head, and a second secondary actuator for positioning the second head without positioning the first head;
    using the first head to write a first servo track on the first disk surface; and
    using the second head to write a second servo track on the second disk surface while positioning the second head in response to the first head reading the first servo track.

22. The method of claim 21, including using the second head to write a third servo track, spaced from the second servo track, on the second disk surface while positioning the second head in response to the first head reading the first servo track.

23. The method of claim 21, including using the first head to write a third servo track, spaced from the first servo track, on the first disk surface while positioning the first head in response to the second head reading the second servo track.

24. The method of claim 21, including using the first head to write all servo information that is written to the first disk surface, except for the first servo track, while positioning the first head in response to the second head reading servo information on the second disk surface.

25. The method of claim 21, including using the second head to write all servo information that is written to the second disk surface while positioning the second head in response to the first head reading servo information on the first disk surface.

26. The method of claim 21, including using the first head to write the first servo track without using any other head in the disk drive.

27. The method of claim 21, including using the first head to write the first track using a physical reference in the disk drive to position the first head.

28. The method of claim 27, wherein the physical reference is a crash stop.

29. The method of claim 21, wherein the first head writes all servo information and user data that is written to the first disk surface, the first head reads all servo information and user data that is read from the first disk surface, the second head writes all servo information and user data that is written to the second disk surface, and the second head reads all servo information and user data that is read from the second disk surface.

30. The method of claim 21, wherein the first and second disk surfaces are opposing surfaces of a single magnetic disk.

31. A method for self servo track writing in a disk drive that includes: (a) a first disk surface for storing data; (b) a second disk surface for storing data; (c) wherein the first disk surface is separated from and substantially parallel to the second disk surface; (d) wherein the first and second disk surfaces have substantially the same radius and, during operation, rotate about a common axis; (e) a first head for transferring data to and from the first disk surface; (f) a second head for transferring data to and from the second disk surface; (g) a multi-stage actuator for positioning the first and second heads at desired locations over the first and second disk surfaces; (h) wherein the multi-stage actuator includes a primary actuator for simultaneously moving the first and second heads; and (i) wherein the multi-stage actuator includes a first secondary actuator for moving the first head without moving the second head and second secondary actuator for moving the second head without moving the first head, the method comprising:
    (1) writing a first servo track from the first head to the first disk surface using the primary actuator and the first secondary actuator to position the first head;
    (2) writing a plurality of second servo tracks from the second head to the second disk surface using the primary actuator, the second secondary actuator, the first head and the first servo track to position the second head; and
    (3) writing a plurality of third servo tracks from the first head to the first disk surface using the primary actuator, the first secondary actuator, the second head and a selected one of the second servo tracks to position the first head.

32. The method of claim 31, wherein the first disk surface includes first user data tracks within a first data storage region and the first servo track is outside the first data storage region.

33. The method of claim 32, wherein the second disk surface includes second data tracks within a second data storage region and at least one of the second servo tracks is within the second data storage region.

34. The method of claim 33, wherein at least one of the second servo tracks is outside the second data storage region.

35. The method of claim 33, wherein at least one of the third servo tracks is within the first data storage region.

36. The method of claim 31, wherein at least one of the second servo tracks is coincident with a user data track on the second disk surface.

37. The method of claim 31, wherein at least one of the third servo tracks is coincident with a user data track on the first disk surface.

38. The method of claim 31, wherein the first servo track includes servo data used to generate a clock signal that provides predetermined spacings between servo sectors on the second servo tracks, and the selected one of the second servo tracks includes servo data used to generate a clock signal that provides predetermined spacings between servo sectors on the third servo tracks.

39. The method of claim 31, wherein writing the second servo tracks includes using the second secondary actuator to position the second head over each of the second servo tracks while the first secondary actuator positions the first head over the first servo track, and writing the third servo tracks includes using the first secondary actuator to position the first head over each of the third servo tracks positions while the second secondary actuator positions the second head over the selected one of the second servo tracks.

40. The method of claim 31, wherein writing the first servo track includes using the multi-stage actuator to position the first head over the first servo track using a crash stop.

41. A method for self servo track writing in a disk drive that includes: (a) a first disk surface for storing data; (b) a second disk surface for storing data; (c) wherein the first disk surface is separated from and substantially parallel to the second disk surface; (d) wherein the first and second disk surfaces have substantially the same radius and, during operation, rotate about a common axis; (e) a first head for transferring data between the first disk surface and an exterior environment; (f) a second head for transferring data between the second disk surface and the exterior environment; (g) a multi-stage actuator for positioning the first and second heads at desired locations over the first and second disk surfaces; (h) wherein the multi-stage actuator includes a primary actuator for simultaneously moving the first and second heads; and (i) wherein the multistage actuator includes a first secondary actuator for moving the first head and second secondary actuator for moving the second head, the method comprising:

(1) using the primary actuator and the first secondary actuator to write a first servo track on the first disk surface with the first head;

(2) using the primary actuator, the second secondary actuator and the first servo track to write a second servo track on the second disk surface with the second head; and (3) using the primary actuator, the first secondary actuator and the second servo track to write a third servo track on the first disk surface with the first head.

42. The method of claim 41, wherein the third servo track is closer to the common axis than the first servo track.

43. The method of claim 41, wherein the first and second servo tracks are equally spaced from the common axis.

44. The method of claim 41, wherein step (1) includes positioning the primary actuator against a crash stop.

45. The method of claim 41, wherein step (1) excludes using the second head.

46. The method of claim 41, wherein step (2) includes writing at least two servo tracks on the second disk surface with one of the at least two servo tracks being the second servo track.

47. The method of claim 41, wherein step (3) includes writing at least two servo tracks on the first disk surface that are separate from the first servo track.

48. The method of claim 41, wherein at least one of steps (1), (2) and (3) includes positioning the primary actuator such that the first and second secondary actuators are able to travel through substantially their entire range of motion.

49. The method of claim 41, wherein the first head writes all servo information that is written to the first disk surface, and the second head writes all servo information that is written to the second disk surface.

50. The method of claim 41, wherein the first and second disk surfaces are opposing surfaces of a single magnetic disk.

51. A method for self servo track writing in a disk drive that includes: (a) a first disk surface for storing data; (b) a second disk surface for storing data; (c) wherein the first disk surface is separated from and substantially parallel to the second disk surface; (d) wherein the first and second disk surfaces have substantially the same radius and, during operation, rotate about a common axis; (e) a first head for transferring data to and from the first disk surface; (f) a second head for transferring data to and from the second disk surface; (g) a multi-stage actuator for positioning the first and second heads at desired locations over the first and second disk surfaces; (h) wherein the multi-stage actuator includes a primary actuator for simultaneously moving the first and second heads; and (i) wherein the multi-stage actuator includes a first secondary actuator for moving the first head and second secondary actuator for moving the second head, the method comprising:

(a) setting x=1;

(b) setting y=1 and z=1;

(c) positioning the primary actuator at a location x;

(d) using the first secondary actuator to position the first head to write servo track y at radial location y on the first disk surface;

(e) writing servo track y at the radial location y on the first disk surface;

(f) using the first head to read the servo track y on the first disk surface;

(g) using the second secondary actuator to position the second head to write servo track z at radial location z on the second disk surface;

(h) writing servo track z at the radial location z on the second disk surface;

(i) determining if z is less than or equal to a first predetermined number;

(j) if z is less than or equal to the first predetermined number, then incrementing z, using the second secondary actuator to position the second head to write servo track z at radial location z on the second disk surface, writing servo track z at radial location z on the second surface, and repeating step (i);

(k) if z is equal to the first predetermined number, then incrementing y and determining if y is less than or equal to a second predetermined number;

(l) if y is less than or equal to the second predetermined number, then using the first secondary actuator to position the first head to write servo track y at radial location y on the first disk surface and writing servo track y at radial location y on the first disk surface;

(m) if y is equal to the second predetermined number, incrementing x and determining if x is less than or equal to a third predetermined number;

(n) if x is less than or equal to the third predetermined number, then repeating steps (b) through (m); and (o) if x is greater than the third predetermined number, then stopping the servo track writing.

52. The method of claim 51, wherein when x=1, the step of positioning the primary actuator at location x is determined by a crash stop.

53. The method of claim 51, wherein at least one of the first predetermined number and second predetermined number is greater than 1.

54. The method of claim 51, wherein both of the first predetermined number and the second predetermined number are greater than 1.

55. The method of claim 54, wherein the first predetermined number is equal to the second predetermined number.

56. The method of claim 54, wherein the first predetermined number and the second predetermined number have a difference of one.

57. The method of claim 51, wherein at least one of the first predetermined number and the second predetermined number is 1.

58. The method of claim 51, wherein the first predetermined number and the second predetermined number are both 1.

59. The method of claim 51, wherein the first and second heads write all servo information that is written to the first and second disk surfaces, respectively.

60. The method of claim 51, wherein all servo track writing for the disk drive is provided without an exterior servo track writer.

* * * * *